(12) United States Patent
Salais

(10) Patent No.: US 11,796,300 B2
(45) Date of Patent: Oct. 24, 2023

(54) ANGLE GAUGE

(71) Applicant: Michael Salais, Grover Beach, CA (US)

(72) Inventor: Michael Salais, Grover Beach, CA (US)

( * ) Notice: Subject to any disclaimer, the term of this patent is extended or adjusted under 35 U.S.C. 154(b) by 766 days.

(21) Appl. No.: 16/600,531

(22) Filed: Oct. 13, 2019

(65) Prior Publication Data

US 2020/0232779 A1     Jul. 23, 2020

Related U.S. Application Data

(60) Provisional application No. 62/717,933, filed on Aug. 13, 2018.

(51) Int. Cl.
| | |
|---|---|
| *G01B 5/24* | (2006.01) |
| *G01C 9/02* | (2006.01) |
| *E06C 7/00* | (2006.01) |
| *G01C 9/00* | (2006.01) |
| *G01B 5/26* | (2006.01) |

(52) U.S. Cl.
CPC ............... *G01B 5/24* (2013.01); *E06C 7/003* (2013.01); *G01B 5/26* (2013.01); *G01C 9/00* (2013.01); *G01C 9/02* (2013.01)

(58) Field of Classification Search
CPC ... G01B 5/24; G01B 5/26; G01B 5/00; G01B 5/25; E06C 7/003; G01C 9/00; G01C 23/005; G01C 9/02; E06B 7/18
See application file for complete search history.

(56) References Cited

U.S. PATENT DOCUMENTS

| | | | | |
|---|---|---|---|---|
| 1,623,463 | A * | 4/1927 | Collins | G01C 9/12 |
| | | | | 33/391 |
| 1,829,990 | A * | 11/1931 | Hettrick | G01C 9/20 |
| | | | | 33/351 |
| 1,901,793 | A * | 3/1933 | Allen | G01C 9/12 |
| | | | | 33/399 |
| 2,175,751 | A * | 10/1939 | Fairchild | G01C 9/12 |
| | | | | 33/391 |

(Continued)

FOREIGN PATENT DOCUMENTS

| | | | | | |
|---|---|---|---|---|---|
| GB | 2068547 | A * | 8/1981 | ............. | E06C 7/003 |
| GB | 2269899 | A * | 2/1994 | ............... | G01C 9/28 |

(Continued)

*Primary Examiner* — Phi D A
(74) *Attorney, Agent, or Firm* — Dunlap Bennett & Ludwig, PLLC

(57) ABSTRACT

An angle gauge for immediately determining if an inclination of a ladder against a vertical surface is satisfactory is provided. The angle gauge has a circular base portion and an indicator dial rotatably connected to the center of a face of the base portion. A straight edge flange is connected to the base portion to provide a straight edge extending tangentially from the circumference thereof. The face has top and bottom halves dividing by an angle line, wherein the angle line is adjustable so as to select a target angle between the angle line relative to the straight edge. The indicator dial obscures half of the face at all times. The straight edge is connected to a rung of a ladder so that if the ladder is not oriented at the target angle relative to vertical supporting surface, the bottom half is partially visible above the indicator dial.

9 Claims, 2 Drawing Sheets

(56) References Cited

U.S. PATENT DOCUMENTS

| | | | | |
|---|---|---|---|---|
| 2,353,911 A | * | 7/1944 | Leveille | G01C 9/12 33/391 |
| 2,791,836 A | * | 5/1957 | Gerber | G01B 5/24 33/561.1 |
| 3,118,234 A | | 1/1964 | Wilson | |
| 3,159,924 A | | 12/1964 | George et al. | |
| 3,533,167 A | * | 10/1970 | Thompson | G01C 9/12 33/351 |
| 4,554,994 A | * | 11/1985 | Weiner | E06C 7/46 116/307 |
| 4,823,912 A | | 4/1989 | Gould et al. | |
| 4,989,334 A | * | 2/1991 | DuBose, Jr. | G01C 9/00 D10/64 |
| 5,058,283 A | | 10/1991 | Wise et al. | |
| 5,339,921 A | | 8/1994 | Faupel | |
| 5,341,899 A | | 8/1994 | Casamento | |
| 5,461,752 A | | 10/1995 | Lemon et al. | |
| 5,680,707 A | * | 10/1997 | Boelling | G01C 9/12 33/399 |
| 5,740,881 A | | 4/1998 | Lensak | |
| 5,956,855 A | * | 9/1999 | Foss | E06C 7/003 33/391 |
| D488,398 S | | 4/2004 | Golaszewski et al. | |
| 7,392,593 B2 | | 7/2008 | Rivers et al. | |
| 2006/0124390 A1 | * | 6/2006 | Rivers | G01C 9/12 182/18 |
| 2006/0207830 A1 | | 9/2006 | Gray et al. | |
| 2008/0006479 A1 | | 1/2008 | Mabry | |
| 2010/0012429 A1 | | 1/2010 | Bates | |
| 2010/0224444 A1 | | 9/2010 | Simeonov et al. | |
| 2011/0119940 A1 | | 5/2011 | Zerhusen | |
| 2011/0226551 A1 | | 9/2011 | Iverson et al. | |
| 2012/0266436 A1 | | 10/2012 | Rittmann | |
| 2015/0053504 A1 | | 2/2015 | Ross et al. | |
| 2016/0334200 A1 | | 11/2016 | Zhuang | |

FOREIGN PATENT DOCUMENTS

| | | | | |
|---|---|---|---|---|
| GB | 2408540 A | * | 6/2005 | E06C 7/003 |
| GB | 2432622 A | * | 5/2007 | E06C 7/003 |

* cited by examiner

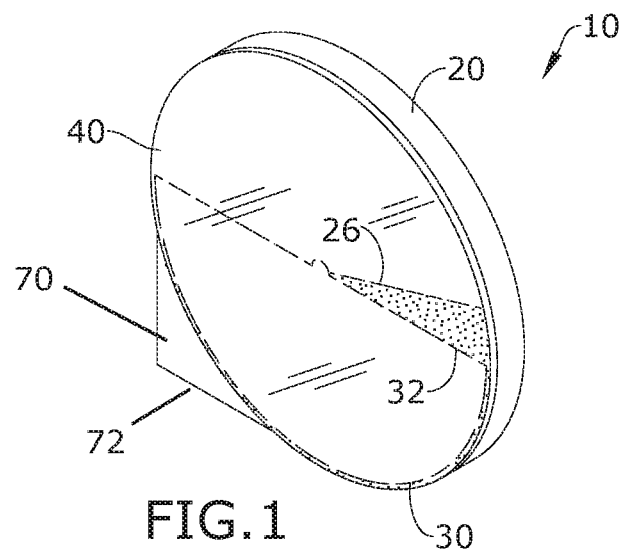
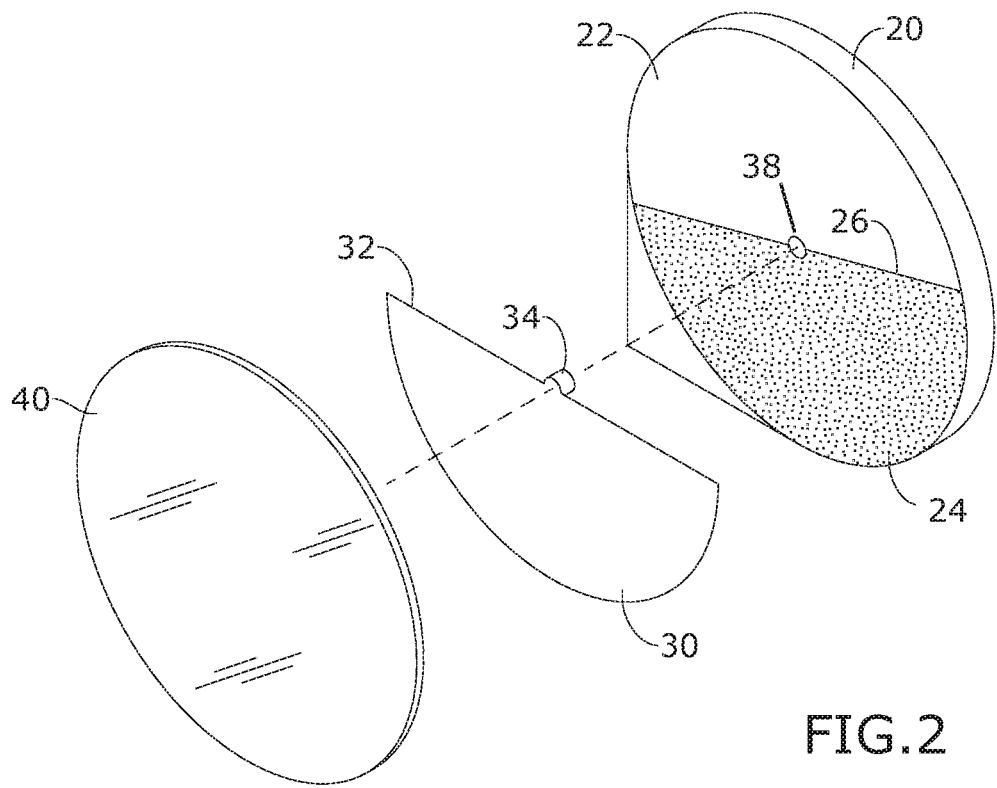

ANGLE GAUGE

CROSS-REFERENCE TO RELATED APPLICATION

This application claims the benefit of priority of U.S. provisional application No. 62/717,933, filed 13 Aug. 2018, the contents of which are herein incorporated by reference.

BACKGROUND OF THE INVENTION

The present invention relates to ladder safety devices and, more particularly, an angle gauge for immediately determining if the ladder inclination is appropriate.

Safely positioning a ladder against a vertical structure or surface is mandated by state and federal laws (OSHA), specifically the ladder inclination. Ladder inclination is the angle of the ladder from the horizontal. If the ladder inclination is too steep, the risk of injury is increased because the ladder is more likely to fall backward when supporting a user. If the ladder inclination is not steep enough, the risk is that the feet or bottom of the ladder will kick out from under the user.

To ensure that a ladder may be ascended safely, the ladder should be placed at an angle of approximately 75° from the horizontal, as mandated by law. When positioning a ladder, however, it is difficult to determine quickly and with certainty that the angle is satisfactory. Currently, the way the angle of the ladder is determined is by approximation—counting the rungs, wherein the formula is 4 to 1: for every four rungs of height one places the ladder one foot away from the vertical surface.

As can be seen, there is a need for an angle gauge for measuring ladder inclination and thus the slope of a ladder's rungs, wherein proper inclination can be determined at a glance.

SUMMARY OF THE INVENTION

In one aspect of the present invention, an angle gauge includes the following: a base having a face and a peripheral edge; an angle line dividing a top portion and a bottom portion of the face; an indicator dial defined in part by an indicator edge; a pivot at an edge center of the indicator edge, the pivot rotatably connected to a line center of the angle line; a straight edge flange connected from and beyond the peripheral edge, the straight edge flange having a straight edge extending tangentially relative to the peripheral edge; and the angle line rotatably about said line center so as to be selectively set at a target angle relative to the straight edge.

In another aspect of the present invention, an OSHA-compliant angle gauge includes the following: a circular base having a face and a peripheral edge; an angle line dividing a top portion and a bottom portion of the face, wherein the bottom portion has an appearance that contrast with the top portion; a semi-circular indicator dial defined in part by an indicator edge; a pivot at an edge center of the indicator edge, the pivot rotatably connected to a line center of the angle line, wherein the pivot cannot resist the urging of gravity; a straight edge flange connected from and beyond the peripheral edge, the straight edge flange having a straight edge extending tangentially relative to the peripheral edge; the angle line rotatably about said line center so as to be selectively set at a target angle relative to the straight edge at 14.5 degrees; and a transparent cover dimensioned to engage the peripheral edge of the base so as to transparently cover said face and indicator dial, wherein so that when the straight edge is inclined by the target angle the bottom portion is not visible for the indicator dial.

In yet another aspect of the present invention, a method of determining if a ladder is inclined against a vertical supporting surface at a preselected target angle includes the following: providing the above-mentioned angle gauge; setting the angle line at the preselected target angle relative to straight line; attaching the straight edge to an upper surface of a rung of a ladder; and inclining the ladder until none of the bottom portion is visible above the indicator edge.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention;

FIG. 2 is an exploded view of an exemplary embodiment of the present invention;

DETAILED DESCRIPTION OF THE INVENTION

Figure 3:
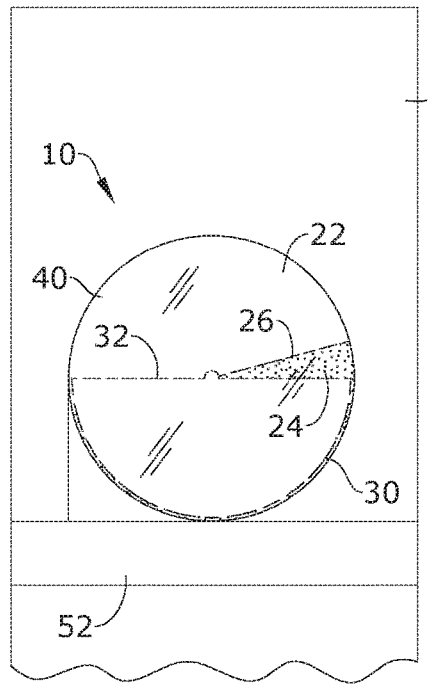
FIG. 3 is a front view of an exemplary embodiment of the present invention, shown on a ladder rung 52 in a generally vertical orientation.
Figure 4:
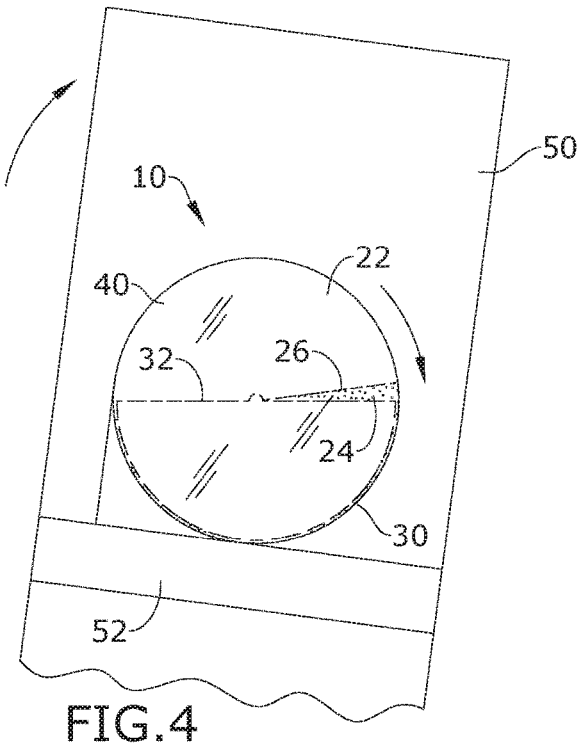
FIG. 4 is a front view of an exemplary embodiment of the present invention, illustrating indicator line 32 remaining horizontal as a gauge 10 inclines with an associated ladder 50 relative to a vertical supporting surface 60.
Figure 5:
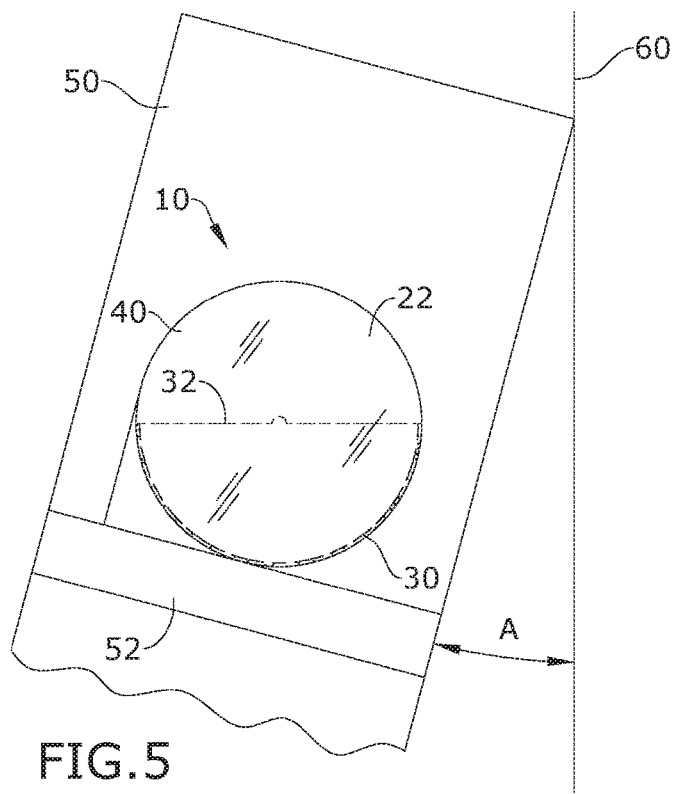
FIG. 5 is a front view of an exemplary embodiment of the present invention, illustrating indicator line 32 aligned with an angle line 26 indicating the ladder 50 is at a target angle A.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an angle gauge for immediately determining if an inclination of a ladder against a vertical surface is satisfactory. The angle gauge has a circular base portion and an indicator dial rotatably connected to the center of a face of the base portion. A straight edge flange is connected to the base portion to provide a straight edge extending tangentially from the circumference thereof. The face has top and bottom halves dividing by an angle line, wherein the angle line is adjustable so as to select a target angle between the angle line relative to the straight edge. The indicator dial may be a half circle so that only half of the face is visible at any one time. The straight edge is connected to a rung of a ladder so that if the ladder is not oriented at the target angle relative to the supporting surface, the bottom half is partially visible above the indicator dial's upper edge, while with the ladder at the target angle the bottom half is not visible above the upper edge.

Referring now to FIGS. 1 through 5, the present invention may include an angle gauge 10 for immediately identifying a ladder's inclination relative to its horizontal and vertical supporting surfaces. State and federal laws (OSHA) specify that a safe ladder inclination for portable ladders results from a placement at a horizontal angle of 75.5 degrees from their horizontal supporting surface. The complimentary angle of 14.5 degrees relative to the vertical supporting surface is considered a target angle A for the present invention.

The angle gauge 10 embodied in the present invention provides a base 20, an indicator dial 30, and a transparent cover 40 for engaging the base 20 so that an indicator dial 30 is visible between the base 20 and the cover 40. The base 20, indicator dial 30, and cover 40 may be substantially circular or semi-circular in shape, though other embodiments may provide square, rectangular and other shapes as long as the device functions as disclosed herein. In certain embodiments, the face of the base 20 is a full circle, while the indicator dial 30 may be half a circle having a diametric boundary defined by an upper indicator edge 32.

It should be understood by those skilled in the art that the use of directional terms such as upper, top, lower, bottom and the like are used in relation to the illustrative embodiments as they are depicted in the figures, the top/upper direction being toward the top of the corresponding figures and a bottom/lower direction being toward the bottom of the corresponding figures.

The face of the base 20 may be dissected into a top half 22 having a top appearance and bottom half 24 having a bottom appearance that contrasts with the top appearance, for example by being different colors. The top and bottom halves 22 and 24 are divided by an angle line 26. Furthermore, the indicator dial 30 may have a dial appearance that contrasts with the bottom appearance/color, though may have the same appearance/color as the top appearance/color.

The base 20 provides a peripherally connected straight edge flange 70. The straight edge flange 70 has a lower straight edge 72 that is tangential to a lower circumferential portion of the base 20. The angle line 26 is at an angle of attack relative to the straight edge 72. The angle line 26 can be selectively rotated about the center (38) of the face of the base 20 so that the target angle A may be selectively chosen as necessary. In certain embodiments, the face of the base may be selectively rotated relative to the base 20 itself when setting the target angle A/angle of attack. Thus said angle of attack may be set to a target angle A. Accordingly, the indicator edge 32 is dimensioned and adapted to work in conjunction with the angle line 26 to indicate the preselected target angle A (the complimentary angle of the angle of ladder inclination relative to a horizontal supporting surface).

The indicator dial 30 may include a pivot 34 disposed at a midpoint/center of the indicator edge 32. The pivot 34 is dimensioned and adapted to operatively associate with a pivot point/center 38 disposed midpoint of the angle line 26 so that the indicator dial 30 rotates relative to the face of the base 20 under the urging of gravity so that the indicator edge 32 is, absent an additional force, always parallel with the underlying horizontal supporting surface, such as the ground or floor. The transparent cover 40 may engage a periphery of the face of the base, so that the entirety of the indicator dial 30 and the face of the base are visible therethrough.

A method of using the present invention may include the following. The angle gauge 10 disclosed above may be provided. The straight edge 72 of the straight edge flange 70 may be attached flush to an upper supporting surface of a rung 52 of a ladder 50. As a result, the angle line 26 has an angle of attack relative to the said upper supporting surface equal to the target angle A. So that with the ladder 50 in a vertical position, the angle line 26 is disposed at the target angle A relative to the horizontal supporting surface, as illustrated in FIG. 3, because the angle line 26 is always offset from the straight edge 72 by the target angle A.

As a result, the bottom half 24 and associated bottom appearance/color is visible above the contrasting dial appearance of the indicator dial 30. And in certain embodiments, when the dial appearance and the top appearance are identical, the contrasting appearance of the bottom appearance is immediately visible sandwiched therebetween.

As the ladder 50 is inclined, the indicator edge 32 moves or remains parallel with the horizontal supporting surface due to the urging of gravity. As a result, when the ladder 50 is inclined toward a vertical supporting surface 60, the indicator edge 32 stays parallel with the horizontal supporting surface while the angle line 26 rotates relative the indicator edge 32 about the pivot point 38 so that the visible portion of the bottom half 24 is reduced until the ladder 50 is at the target angle A relative to the vertical surface 60. At the target angle A, the bottom half 24 is not visible. If the inclination angle of the ladder 50 relative the vertical surface 60 exceeds the target angle A, then the bottom half 26 will become visible (this time on the other side of the pivot point 38).

As a result, a user can immediately visibly identify if the ladder 50 is at the target angle relative to the vertical surface 60 by peering through the transparent cover 40.

It should be understood, of course, that the foregoing relates to exemplary embodiments of the invention and that modifications may be made without departing from the spirit and scope of the invention as set forth in the following claims.

What is claimed is:

1. An angle gauge, comprising:
a circular base;
a face rotatable connected to a center of the circular base;
an angle line indicated on and bisecting the face;
an indicator dial defined in part by an indicator edge;
a pivot at an edge center of the indicator edge, the pivot rotatably connected to a line center of the angle line so that the indicator edge rotates relative to the angle line;
a straight edge flange connected to a circumference of the circular base, the straight edge flange having a straight edge extending tangentially relative to the circular base so that a radius of the circular base is perpendicular to the straight edge through the radial endpoint on the circumference of the circular base; and
the angle line rotatably about said line center, by way of rotating the face, so as to be selectively set at a target angle relative to the straight edge.

2. The angle gauge of claim 1, comprising:
a transparent cover dimensioned to engage the peripheral edge of the base so as to transparently cover said face and indicator dial.

3. The angle gauge of claim 1, wherein the indicator dial is generally coextensive with the bottom portion so that when the straight edge is inclined by the target angle the bottom portion is not visible for the indicator dial.

4. The angle gauge of claim 1, wherein the bottom portion has an appearance that contrast with the top portion and/or the indicator dial.

5. The angle gauge of claim 1, wherein the indicator dial is semi-circular.

6. The angle gauge of claim 1, wherein the target angle is 14.5 degrees.

7. An OSHA-compliant angle gauge, comprising:
a circular base;
a face rotatable connected to a center of the circular base;

an angle line indicated on and bisecting rotatably connected to a line center of the angle line, wherein the pivot cannot resist the urging of gravity;

a semi-circular indicator dial defined in part by an indicator edge;

a pivot at an edge center of the indicator edge, the pivot rotatably connected to a line center of the angle line so that the indicator edge rotates relative to the angle line, wherein the pivot cannot resist the urging of gravity;

a straight edge flange connected to a circumference of the circular base, the straight edge flange having a straight edge extending tangentially relative to the circular base so that a radius of the circular base is perpendicular to the straight edge through the radial endpoint on the circumference of the circular base;

the angle line rotatably about said line center, by way of rotating the face, so as to be selectively set at a target angle relative to the straight edge at 14.5 degrees; and a transparent cover dimensioned to engage the peripheral edge of the base so as to transparently cover said face and indicator dial, wherein so that when the straight edge is inclined by the target angle the bottom portion is not visible for the indicator dial.

8. A method of determining if a ladder is inclined against a vertical supporting surface at a preselected target angle, comprising:

providing the angle gauge claimed in claim 1;

setting the angle line at the preselected target angle relative to straight edge by way of rotating the face;

attaching the straight edge to an upper surface of a rung of a ladder; and inclining the ladder until none of the bottom portion is visible above the indicator edge.

9. The angle gauge of claim 1, wherein the straight edge flange engages the circumference of the circular base for generally a quadrant of the circular base.

* * * * *